(12) United States Patent
Li et al.

(10) Patent No.: US 12,248,835 B2
(45) Date of Patent: Mar. 11, 2025

(54) METHOD FOR ANTI-TAMPERING APPARATUS SERVICING DATA AND SYSTEM THEREOF

(71) Applicant: Industrial Technology Research Institute, Hsinchu (TW)

(72) Inventors: Min-Hao Li, Hsinchu (TW); Yu-Chiao Wang, Hsinchu (TW); Ya-Ping Lee, Hsinchu (TW); Wei-Der Chung, Hsinchu (TW); Jhy-Ping Wu, Hsinchu (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 309 days.

(21) Appl. No.: 18/145,717

(22) Filed: Dec. 22, 2022

(65) Prior Publication Data
US 2024/0169167 A1    May 23, 2024

(30) Foreign Application Priority Data
Nov. 21, 2022 (TW) ................................ 111144472

(51) Int. Cl.
| | | |
|---|---|---|
| H04L 9/32 | (2006.01) | |
| G06K 7/00 | (2006.01) | |
| H04L 9/00 | (2022.01) | |

(52) U.S. Cl.
CPC .......... *G06K 7/0008* (2013.01); *H04L 9/3236* (2013.01); *H04L 9/50* (2022.05)

(58) Field of Classification Search
CPC ................................ H04L 9/50; H04L 9/3236
See application file for complete search history.

(56) References Cited

U.S. PATENT DOCUMENTS

| | | | | |
|---|---|---|---|---|
| 10,181,948 B1 * | 1/2019 | Nenov | ................. | G06F 9/44505 |
| 2015/0261966 A1 * | 9/2015 | Mensch | .............. | H04L 63/0876 |
| | | | | 713/189 |

(Continued)

FOREIGN PATENT DOCUMENTS

| | | |
|---|---|---|
| CN | 110490613 A | 11/2019 |
| TW | 202008290 A | 2/2020 |

OTHER PUBLICATIONS

Bhandary et al., "A Blockchain Solution based on Directed Acyclic Graph for IoT Data Security using IoTA Tangle," 2020 5th International Conference on Communication and Electronics Systems (ICCES), 2020, pp. 827-832, doi: 10.1109/ICCES48766.2020.9137858.

(Continued)

*Primary Examiner* — Vance M Little
(74) *Attorney, Agent, or Firm* — HSML P.C.

(57) ABSTRACT

The present disclosure provides a method for anti-tampering apparatus servicing data implemented by a calculation device connected to a target device, the method comprising: identifying a contract identification code and obtaining a contract package file and a contract authentication code from at least one remote device; obtaining a microservice file corresponding to the target device from the remote device when a device embedded code of the calculation device is matching the contract authentication code; performing the microservice file to enable the target device according to the contract package file and generate an execution report; publishing the execution report to the remote device to obtain an acceptance certification code; and combining and hashing the device embedded code, the contract authentication code and the acceptance certification code to generate a hash value, and sending the hash value to a blockchain. The (Continued)

present disclosure further provides a system for anti-tampering apparatus servicing data.

22 Claims, 2 Drawing Sheets

(56) References Cited

U.S. PATENT DOCUMENTS

| | | | | |
|---|---|---|---|---|
| 2018/0040041 | A1* | 2/2018 | Metnick | G06Q 30/012 |
| 2018/0248880 | A1* | 8/2018 | Sardesai | H04L 9/3239 |
| 2019/0172067 | A1* | 6/2019 | Arora | G06Q 20/4016 |
| 2020/0027066 | A1* | 1/2020 | Ramasamy | G06Q 20/3825 |
| 2020/0286162 | A1* | 9/2020 | Liu | G06Q 20/4014 |
| 2020/0293500 | A1* | 9/2020 | Patil | G06F 16/1824 |
| 2021/0314305 | A1* | 10/2021 | Rodriguez | H04L 67/306 |
| 2021/0342329 | A1* | 11/2021 | Padmanabhan | G06F 16/28 |
| 2021/0344717 | A1* | 11/2021 | Shetty | H04L 9/0637 |
| 2022/0100731 | A1 | 3/2022 | Azpiroz et al. | |

OTHER PUBLICATIONS

Zichichi et al., "A Framework Based on Distributed Ledger Technologies for Data Management and Services in Intelligent Transportation Systems," in IEEE Access, vol. 8, pp. 100384-100402, 2020, doi: 10.1109/ACCESS.2020.2998012.

Nakada et al., "An IOTA-Based Micropayment System for Air Quality Monitoring Application," 2021 IEEE 94th Vehicular Technology Conference (VTC2021-Fall), 2021, pp. 1-6, doi: 10.1109/VTC2021-Fall52928.2021.9625358.

Ali et al., "Efficient and Secure Energy Trading in Internet of Electric Vehicles Using IOTA Blockchain," 2020 IEEE 17th International Conference on Smart Communities: Improving Quality of Life Using ICT, IoT and AI (HONET), 2020, pp. 87-91, doi: 10.1109/HONET50430.2020.9322826.

Vieira et al., "IOTApass: Enabling Public Transport Payments with IOTA," 2020 IEEE 6th World Forum on Internet of Things (WF-IoT), 2020, pp. 1-6, doi: 10.1109/WF-IoT48130.2020.9221224.

Leivadaros et al., "Secure Asset Tracking in Manufacturing through Employing IOTA Distributed Ledger Technology," 2021 IEEE/ACM 21st International Symposium on Cluster, Cloud and Internet Computing (CCGrid), 2021, pp. 754-761, doi: 10.1109/CCGrid51090.2021.00091.

Bhandary et al., "Securing Logs of a System—An IoTA Tangle Use Case," 2020 International Conference on Electronics and Sustainable Communication Systems (ICESC), 2020, pp. 697-702, doi: 10.1109/ICESC48915.2020.9155563.

* cited by examiner

METHOD FOR ANTI-TAMPERING APPARATUS SERVICING DATA AND SYSTEM THEREOF

BACKGROUND

1. Technical Field

The present disclosure relates to a technology for anti-tampering apparatus servicing data, and more particularly, to a method for anti-tampering apparatus servicing data and a system thereof that can prevent human operation.

2. Description of Related Art

In recent years, data forging and tampering occurred one after another at various key component manufacturers in the supply chain, for example, a steel company forged factory test data of the strength and size of some aluminum and copper products for a long time and sell defective products as quality products; a metal company did not conduct testing according to customer requirements and regulations and changed testing conditions or directly tampers testing results for 30 years; an airbag company continuously and systematically tampered a key testing data related to product safety; a motor company forged a quality testing data for more than 30 years, and so on. The events show that there are no good certification and traceability mechanisms for products currently, and they only rely on the self-discipline of the key component manufacturers in the supply chain. If a fraudulent event occurs in the supply chain such as in the aerospace industry, it may endanger the safety of consumers. In addition, currently, the key component manufacturers only provide paper documents as evidence for items such as devices, materials, and manufacturing methods, which increases the possibility of data being tampered with. Also, the paper documents cannot effectively ensure which device is actually used in the supply chain, and there is no historical information available for querying.

SUMMARY

An aspect of the present disclosure is to provide a method for anti-tampering apparatus servicing data implemented by a calculation device connected to a target device after reading, the method for anti-tampering apparatus servicing data comprises: identifying a contract identification code and obtaining a contract package file and a contract authentication code from at least one remote device according to the contract identification code, wherein the calculation device has a device embedded code corresponding to the target device; determining whether the device embedded code matches the contract authentication code and obtaining a microservice file corresponding to the target device from the remote device after confirming the match; performing the microservice file to enable the target device to operate according to the contract package file and generate an execution report after the target device completes the operation; publishing the execution report to the remote device to obtain an acceptance certification code; and combining and hashing the device embedded code, the contract authentication code, and the acceptance certification code to generate a hash value, and then sending the hash value to a blockchain.

Another aspect of the present disclosure is to provide a system for anti-tampering apparatus servicing data, comprising: at least one remote device including a database that stores a contract package file, a contract authentication code, at least one microservice file, and data including device information, device service items, process parameters, monitoring data, and acceptance specifications; and a calculation device connected to a target device, including: an identification analysis module configured to identify a contract identification code and obtain the contract package file and the contract authentication code from the remote device according to the contract identification code; a match module having a device embedded code corresponding to the target device, and the match module determines whether the device embedded code matches the contract authentication code and obtains a microservice file corresponding to the target device from the remote device after confirming the match; an execute contract module performing the microservice file to enable the target device to operate according to the contract package file, generate an execution report after the target device completes the operation, and publish the execution report to the remote device to obtain an acceptance certification code; and an uplink module combining hashing the device embedded code, the contract authentication code, and the acceptance certification code to generate a hash value, and then sending the hash value to a blockchain.

The method for anti-tampering apparatus servicing data and the system thereof according to the present disclosure may ensure that the device service data will not be tampered with during the whole operation process. When the device is in operation, it will automatically and completely follow the contract content, therefore preventing human intervention and data from being tampered with. Furthermore, the method for anti-tampering apparatus servicing data and the system thereof according to the present disclosure may also expand and update the device services at any time under a device service binding contract and a device service will automatically be converted into a code-free smart contract. Hence, the present disclosure has characteristics of service scalability and upgradeability.

DETAILED DESCRIPTIONS

The following describes the implementation of the present disclosure with specific embodiments. Those familiar with the art can easily understand the other advantages and effects of the present disclosure from the content disclosed in this specification. The present disclosure can also be implemented or applied by other different specific embodiments.

Figure 1:
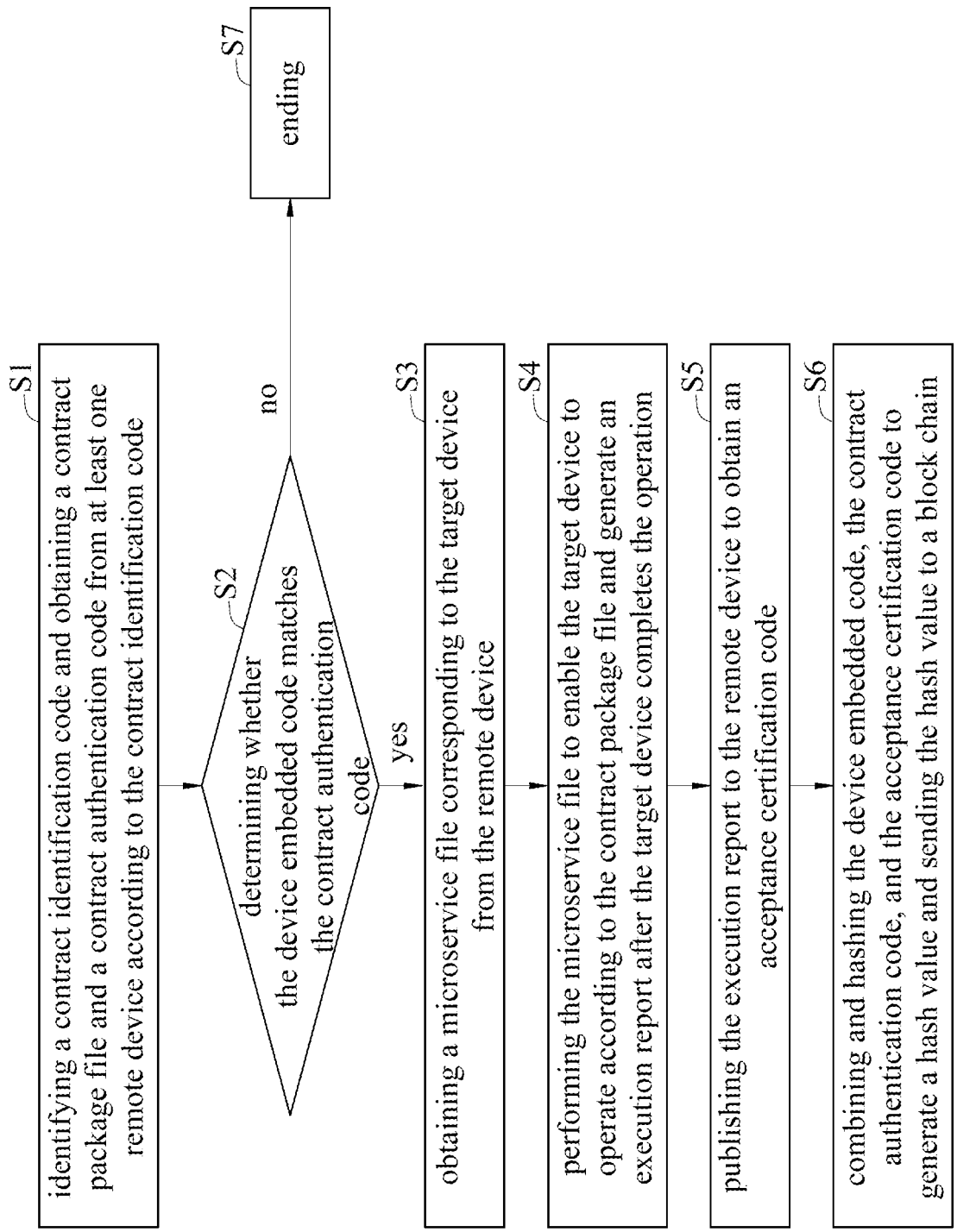
FIG. 1 is a flow chart of a method for anti-tampering apparatus servicing data according to an embodiment of the present disclosure.
Figure 2:
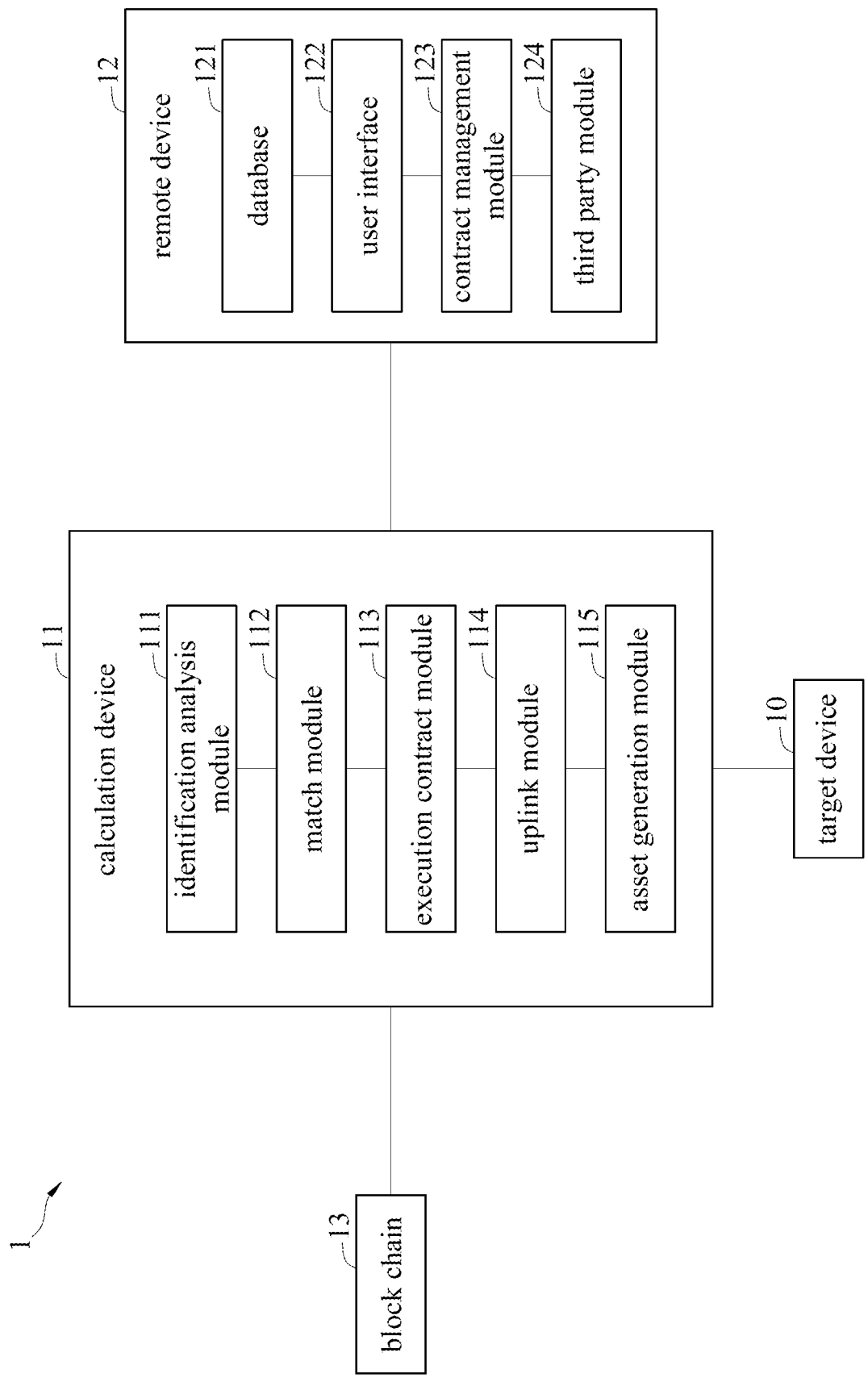
FIG. 2 is a schematic view of a system for anti-tampering apparatus servicing data according to an embodiment of the present disclosure.

Please refer to FIG. 1 and FIG. 2. FIG. 1 is a flow chart of a method for anti-tampering apparatus servicing data according to an embodiment of the present disclosure, and FIG. 2 is a schematic view of a system for anti-tampering apparatus servicing data according to an embodiment of the present disclosure. The system for anti-tampering apparatus servicing data 1 comprises a calculation device 11 and at least one remote device 12 and connects a target device 10 and a blockchain 13 to implement. The calculation device 11 includes an identification analysis module 111, a match module 112, an execution contract module 113, an uplink module 114, and an asset generation module 115, and the remote device 12 includes a database 121, a user interface 122, a contract management module 123, and a third party module 124. The method for anti-tampering apparatus servicing data and the system thereof according to the present disclosure may be divided into a construction phase, a contract establishment phase, and an application phase, which are described in detail below.

At the construction phase, the calculation device 11 is connected to the target device 10 in a one-to-one manner through a communication interface (such as Ethernet) or a communication protocol (such as MQTT, OPC UA, Modbus, and so on). In this embodiment, the calculation device 11 may be a desktop computer, a notebook computer, a tablet, or a server, or it may be an embedded hardware, as long as it is a hardware with a processor, a memory, and a storage device and has computing functions. The target device 10 may be a testing device or a processing device, and the remote device 12 may be, but not limited to, a cloud server. In addition, each of the above modules may be an APP, a software, a firmware, or a program codes stored in the storage device and implement after being read through the processor with the memory.

After the calculation device 11 is connected to the target device 10, the asset generation module 115 in the calculation device 11 may generate a microservice file corresponding to the target device 10 and generate data including device information, device service items, process parameters, monitoring data, and acceptance specifications, according to functions of the target device 10. Afterwards, the asset generation module 115 may publish the microservice file to the remote device 12 to obtain the device embedded code and also publish the data including the device information, the device service items, the process parameters, the monitoring data, and the acceptance specifications to the remote end device 12 to register.

In detail, the asset generation module 115 further generates a device service list based on the data including the device information, the device service items, the process parameters, the monitoring data, and the acceptance specifications and stores the device service list to the database 121 of the remote device 12 to register. A format of the device service list may be, but not limited to, AAS X, DTDL, and so on. The device service list may be a hierarchical list, wherein different device information corresponds to different device service items, and different device service items correspond to various process parameters, monitoring data, and acceptance specifications. For example, in the case where the target device 10 is a testing device, the device information may be, for example, a device type, the device service items may include, for example, a transmission efficiency test, a rigid backlash test, and so on, and the process parameters may include a rated torque, an output torque, a forward/reverse rotation, and so on. The microservice file may be a plurality of applications, which may respectively correspond to different functions of the target device 10 after performing. The asset generation module 115 may publish the microservice file to the third party module 124 to obtain the device embedded code, check the device embedded code with the data in the database 121, and store the device embedded code in the match module 112.

In an embodiment, the third party module 124 may be a Docker platform, and the device embedded code is a hash value. The corresponding microservice file may be obtained by sending the device embedded code to the Docker platform, and of course, the data including the device information, the device service items, the process parameters, the monitoring data, and the acceptance specifications may also be obtained from the database 121.

In an embodiment, if the target device 10 is upgraded after registering, the asset generation module 115 will generate a new microservice file and a new device service list (such as V2.0), but will not delete the old microservice file and the old device service list (such as V1.0). They can exist at the same time, so that the user can select later. Furthermore, actually, there may be multiple target devices 10 and corresponding calculation devices 11 (for example, forming a complete supply chain), and they may connect to the remote device 12 at the same time. Moreover, a new target device 10 and a new calculation device 11 may be added at any time, as long as the new calculation device 11 registers the new target device 10, so that a content corresponding to the new target device 10 will appear at the device service list.

At the contract establishment phase, when the user has a requirement to test a device under test, the user can browse the user interface 122 of the remote device 12, and the user interface 122 reads the device service list for the user to select. Specifically, the user interface 122 is an interactive webpage presented by a dynamic web server providing HTTP protocol services, but the present disclosure is not limited thereto. The user can select the corresponding device information, device service items, process parameter, monitoring data, and acceptance specification on the user interface 122 according to the device under test. For example, in the case where the device under test is a reducer, the device information may be selected as a reducer test stand, the device service items may be selected as a transmission efficiency test or a rigid backlash test, and so on, and the corresponding process parameters may include a rated torque, an output torque, a forward/reverse rotation, and so on. The monitoring data are data that need to be monitored during the execution process, and their types may correspond to the process parameters, which can be set by the user according to the needs. The acceptance specifications are items for testing, and their types may correspond to the device service items, the process parameters, and so on.

After the user selects the items such as the device information, the device service items, the process parameters, the monitoring data, the acceptance specifications, and so on, a contract content and a signing field appears on the user interface 122. After the user agrees the contract content and signs in the signature field, the contract management module 123 will combine the device information, the device service items, the process parameters, the monitoring data, and the acceptance specifications selected by the user (may also combine with the device under test, the user profile, and so on) to generate a contract package file. In this embodiment, a format of the contract package file may be AASX, DTDL, and so on, and its writing language may be a plain text file format (such as .xml, .JSON), that is, the contract package file is, but not limited to, a codeless smart contract. Afterwards, the contract control module 123 may publish the contract package file to the third party module 124 (it may also be stored in the database 121 at the same time) to obtain the contract authentication code, package a website or a contract code that can download the contract package file into the contract identification code, and store the contract authentication code in the remote device 12. In an embodiment, the contract identification code is, but not limited to, a QR code or a RFID tag. In an embodiment, the third party module 124 may be a git platform, and the contract authentication code is a hash value, so that the corresponding contract package file can be obtained by sending the contract authentication code to the git platform.

As mentioned above, the third party module 124 may be the Docker platform or the git platform, which means that when the remote device 12 is a cloud server, the Docker platform and the git platform are built in the cloud server at the same time, and there are multiple third party modules 124 in this case. Of course, the Docker platform and the git platform may not be built in the remote device 12, which is mentioned in the present disclosure, but using the Docker platform and the git platform that have been built to receive the microservice file and the contract package file respectively. The present disclosure is not limited thereto.

In an embodiment, the contract control module 123 may also provide operation such as contract query, addition, modification, deletion, transmission, and progress control, and present them on the user interface 122 for the user to confirm.

After the contract establishment phase is completed, then go to the application phase. At this phase, the user may send the device under test together with the contract identification code to the laboratory where the target device 10 is located. Please refer to FIG. 1 and FIG. 2 at the same time. In step S1, the identification analysis module 111 of the calculation device 11 is used to identify the contract identification code. In this embodiment, the identification analysis module 111 may be a QR code scanner or a RFID tag sensor, or it may be a software that uses a camera to take a picture of the contract identification code and analyzes its content. If an analyzed content of the contract identification code is a website, the calculation device 11 may directly link the website to obtain the contract package file and the contract authentication code; and if the analyzed content of the contract identification code is a contract code (such as a series of numbers), the calculation device 11 may query with the remote device 12 according to the contract code and correspondingly obtain the contract package file and the contract authentication code. The identification analysis module 111 may also analyze the contract package file, for example, through a device service table grammar file, store the analyzed contract items (such as the device information, the device service items, the process parameters, monitoring data, and the acceptance specifications) in a task sequence for management, and generate instructions corresponding the target device 10 according to the communication interface or the communication protocol. Then go to step S2.

In step S2, the match module 112 is used to determine whether the device embedded code matches the contract authentication code. Since the match module 112 has the device embedded code corresponding to the target device 10, the device information and the device service items corresponding to the device embedded code may be obtained from the database 121, and the match module 112 may also obtain the corresponding device information and device service items according to the contract authentication code. The match module 112 confirms the match, that is, the match module 112 determines whether the device information and the device service items corresponding to the device embedded code are identical to the device information and the device service items corresponding to the contract authentication code. If they match, go to step S3, and if not, go to step S7 to reject the test. The purpose is to confirm that the target device 10 in the laboratory can correspond to the device under test and to confirm that there is a contractual relationship between the target device 10 and the device under test, so as to prevent the device under test from being sent to the wrong laboratory, or implementing without the contract. After the match module 112 confirms the match, the microservice file corresponding to the device can be obtained from the third party module 124 (step S3). Then go to step S4.

In step S4, the contract execution module 113 starts to execute the contract, that is, performs the microservice file to enable the target device 10 according to the contract package file. In detail, the corresponding data including the device information, the device service items, the process parameters, the monitoring data, and the acceptance specifications may be parsed out from the contract package file. The execution contract module 113 enables the target device 10 to execute against the device under test according to the device service items and the process parameter, to record a value according to the monitoring data during executing, and finally to generate an execution report according to the acceptance specification. In an embodiment, when the target device 10 is a testing device, the execution report is a test result report of the device under test, and when the target device 10 is a processing device, the execution report is a product barcode of the device under test (that is, the processing device). Then go to step S5.

In step S5, the execution contract module 113 publishes the execution report to the third party module 124 of the remote device 12 to obtain the acceptance certification code. In this embodiment, the third party module 124 may be a git platform, and the acceptance certification code is a hash value. The corresponding execution report can be obtained by sending the acceptance certification code to the git platform. Then go to step S6.

In step S6, the uplink module 114 may combine the device embedded code, the contract authentication code, and the acceptance certification code into character strings, and perform a hash operation (such as hash256 algorithm) to generate a hash value, and then send the hash value to the blockchain 13. In an embodiment, the blockchain 13 may be, but not limited to, IOTA or Ethereum. Afterwards, the uplink module 114 may send the hash value back to the remote device 12 to let the remote device 12 notify the user that the contract has been fulfilled, and the remote device 12 may send the hash value and the execution report to the user at the same time.

Since the device embedded code, the contract authentication code, and the acceptance certification code according to the present disclosure are hash values, it can ensure that the microservice file, the contract package file, and the execution report may not be tampered. That is, if the microservice file, the contract package file, and the execution report are changed, or the hash values of the device embedded code, the contract authentication code, and the acceptance certification code are changed, they will not correspond to each other. Hence, an anti-tampering effect can be achieved. In addition, the present disclosure also combines the device embedded code, the contract authentication code, and the acceptance certification code to generate a hash value to ensure that the device embedded code, the contract authentication code, and the acceptance certification code will not be tampered. Hence, a double anti-tampering effect can be achieved.

In summary, the method for anti-tampering apparatus servicing data and the system thereof according to the present disclosure may ensure that the device service data will not be tampered during the whole process. When the device is in operation, it will automatically and completely follow the contract content. There is no possibility of human intervention. Hence, the present disclosure has an effect of preventing human operation and data tampering. Furthermore, the method for anti-tampering apparatus servicing data and the system thereof according to the present disclosure may also expand and update device services at any time under a device service binding contract and a device service automatically converted into code-free smart contract. Hence, the present disclosure has characteristics of service scalability and upgradeability.

The above embodiments are used for illustrating the technical principles, characteristics, and effects only rather than limiting the present disclosure. Anyone skilled in the art can modify and alter the above embodiments without departing from the spirit and scope of the present disclosure. Any equivalent modifications and alterations accomplished based on the content taught in the present disclosure should still be included in the scope of the accompanying claims. Therefore, the range claimed by the present disclosure should be as described by the accompanying claims listed below.

What is claimed is:

1. A method for anti-tampering apparatus servicing data implemented by a calculation device connected to a target device after reading, the method for anti-tampering apparatus servicing data comprises:
   identifying a contract identification code, obtaining a contract package file and a contract authentication code from at least one remote device according to the contract identification code, wherein the calculation device has a device embedded code corresponding to the target device;
   determining whether the device embedded code matches the contract authentication code and obtaining a microservice file corresponding to the target device from the remote device after confirming the match;
   performing the microservice file to enable the target device to operate according to the contract package file and generate an execution report after the target device completes the operation;
   publishing the execution report to the remote device to obtain an acceptance certification code; and
   combining and hashing the device embedded code, the contract authentication code, and the acceptance certification code to generate a hash value, and then sending the hash value to a blockchain.

2. The method for anti-tampering apparatus servicing data of claim 1, further comprising: generating a microservice file corresponding to the target device and publishing the microservice file to the remote device to obtain the device embedded code.

3. The method for anti-tampering apparatus servicing data of claim 2, wherein the device embedded code or the contract authentication code is a hash value, and data including device information, device service items, process parameters, monitoring data, and acceptance specifications can be correspondingly obtained from the remote device.

4. The method for anti-tampering apparatus servicing data of claim 3, wherein the step of determining whether the device embedded code matches the contract authentication code is: determining whether the device information and the device service items corresponding to the device embedded code are identical to the device information and the device service items corresponding to the contract authentication code.

5. The method for anti-tampering apparatus servicing data of claim 3, wherein the step of enabling the target device to operate according to the contract package file is: the target device operates an execution according to the device service items and the process parameters, records a value according to the monitoring data during executing, and finally generates the execution report according to the acceptance specification.

6. The method for anti-tampering apparatus servicing data of claim 3, wherein the remote device includes a database storing a device service list, and the device service list includes the device information, the device service items, the process parameters, the monitoring data, and the acceptance specifications.

7. The method for anti-tampering apparatus servicing data of claim 6, wherein the remote device provides a user interface, the user interface reads the device service list and lets a user select, and the remote device combines the device information, the device service items, the process parameters, the monitoring data, and the acceptance specifications selected by the user to generate the contract package file and the contract identification code, and the remote device correspondingly generates the contract authentication code of the contract package file.

8. The method for anti-tampering apparatus servicing data of claim 1, wherein the acceptance certification code is a hash value, and the execution report can be correspondingly obtained from the remote device.

9. The method for anti-tampering apparatus servicing data of claim 1, wherein the remote device is a cloud server, git platform, or Docker platform.

10. The method for anti-tampering apparatus servicing data of claim 1, wherein the target device is a testing device or a processing device.

11. The method for anti-tampering apparatus servicing data of claim 10, wherein when the target device is the processing device, the execution report is a product barcode of a processed product.

12. The method for anti-tampering apparatus servicing data of claim 1, wherein the contract identification code is a QR code or a RFID tag.

13. A system for anti-tampering apparatus servicing data, comprising:
   at least one remote device including a database that stores a contract package file, a contract authentication code, at least one microservice file, and data including device information, device service items, process parameters, monitoring data, and acceptance specifications; and
   a calculation device connected to a target device, including:
      an identification analysis module configured to identify a contract identification code and obtain the contract package file and the contract authentication code from the remote device according to the contract identification code;
      a match module having a device embedded code corresponding to the target device, and the match module determines whether the device embedded code matches the contract authentication code and obtains a microservice file corresponding to the target device from the remote device after confirming the match;
      an execute contract module performing the microservice file to enable the target device to operate according to the contract package file, generate an execution report after the target device completes the operation, and publish the execution report to the remote device to obtain an acceptance certification code; and
      an uplink module combining and hashing the device embedded code, the contract authentication code, and the acceptance certification code to generate a hash value, and then sending the hash value to a blockchain.

14. The system for anti-tampering apparatus servicing data of claim 13, wherein the calculation device further includes an asset generation module, and the asset generation module is configured to generate a microservice file corresponding to the target device and publish the microservice file to the remote device to obtain the device embedded code.

15. The system for anti-tampering apparatus servicing data of claim 14, wherein the remote device further includes at least one third party module, and the third party module is configured to receive the contract package file and correspondingly generate the contract authentication code, to receive the microservice file to correspondingly generate the device embedded code, or to receive the execution report to correspondingly generate the acceptance certification code.

16. The system for anti-tampering apparatus servicing data of claim 15, wherein the third party module is a git platform or a Docker platform, the third party module is configured to generate the contract authentication code and the acceptance certification code when the third party module is the git platform, and the third party module is configured to generate the device embedded code when the third party module is the Docker platform.

17. The system for anti-tampering apparatus servicing data of claim 13, wherein the match module determines whether the device information and the device service items corresponding to the device embedded code are identical to the device information and the device service items corresponding to the contract authentication code.

18. The system for anti-tampering apparatus servicing data of claim 13, wherein the execute contract module enables the target device to execute according to the device service items and the process parameters, to record a value according to the monitoring data during executing, and finally to generate the execution report according to the acceptance specification.

19. The system for anti-tampering apparatus servicing data of claim 13, wherein the database further stores a device service list, and the device service list includes the device information, the device service items, the process parameters, the monitoring data, and the acceptance specifications.

20. The system for anti-tampering apparatus servicing data of claim 19, wherein the remote device further includes a user interface and a contract management module, the user interface reads the device service list and lets a user select, and the contract management module combines the device information, the device service items, the process parameters, the monitoring data, and the acceptance specifications selected by the user to generate the contract package file and the contract identification code.

21. The system for anti-tampering apparatus servicing data of claim 13, wherein the remote device is a cloud server, a git platform, or a Docker platform.

22. The system for anti-tampering apparatus servicing data of claim 13, wherein the contract identification code is a QR code or a RFID tag.

* * * * *